United States Patent
Melikyan et al.

(10) Patent No.: US 11,139,907 B2
(45) Date of Patent: Oct. 5, 2021

(54) METHODS AND APPARATUS FOR TUNING OPTICAL MICRORING DEVICES

(71) Applicant: Nokia Solutions and Networks OY, Espoo (FI)

(72) Inventors: Argishti Melikyan, Matawan, NJ (US); Po Dong, Morganville, NJ (US)

(73) Assignee: Nokia Solutions and Networks OY, Espoo (FI)

( * ) Notice: Subject to any disclaimer, the term of this patent is extended or adjusted under 35 U.S.C. 154(b) by 210 days.

(21) Appl. No.: 16/183,261

(22) Filed: Nov. 7, 2018

(65) Prior Publication Data
US 2020/0145123 A1    May 7, 2020

(51) Int. Cl.
| H04J 14/02 | (2006.01) |
| G02F 1/01 | (2006.01) |
| H04B 1/04 | (2006.01) |
| H04B 1/10 | (2006.01) |

(52) U.S. Cl.
CPC .......... H04J 14/0283 (2013.01); G02F 1/011 (2013.01); H04B 1/0475 (2013.01); H04B 1/1027 (2013.01); *H04B 2001/1072* (2013.01)

(58) Field of Classification Search
CPC .... H04J 14/0283; G02F 1/011; H04B 1/0475; H04B 1/1027; H04B 2001/1072
USPC ......................................................... 398/192
See application file for complete search history.

(56) References Cited

U.S. PATENT DOCUMENTS

| 5,486,943 A | * | 1/1996 | Sasayama | .......... | H04Q 11/0001 |
| | | | | | 365/215 |
| 6,873,923 B1 | * | 3/2005 | Roscoe | ................ | G06K 9/0053 |
| | | | | | 702/189 |
| 9,954,618 B1 | | 4/2018 | Dong et al. | | |
| 2004/0080809 A1 | * | 4/2004 | Mermelstein | ....... | H01S 3/09415 |
| | | | | | 359/333 |

(Continued)

OTHER PUBLICATIONS

Padmaraju, Kishore, et al. "Wavelength locking and thermally stabilizing microring resonators using dithering signals." Journal of Lightwave Technology 32.3 (2014): 505-512.

(Continued)

*Primary Examiner* — Dalzid E Singh
(74) *Attorney, Agent, or Firm* — Mendelsohn Dunleavy, P.C.; Yuri Gruzdkov

(57) ABSTRACT

An optical system having a plurality of ring resonators that can be tuned by regulating their local temperatures in a manner that enables: initial spectral alignment of the optical resonances with the desired carrier wavelengths; fine-tuning of the ring resonators to spectrally align a selected feature of the optical resonances with the carrier wavelengths; and continuous tuning of the ring resonators to counter any detuning thereof during operation. The initial spectral alignment can be performed using intensity/frequency modulation of different carrier wavelengths with different respective frequencies and detection of said frequencies in the photocurrents generated by the individual ring resonators under reverse-bias conditions. After the initial spectral alignment, the ring resonators can be tuned by dithering the local temperatures and then using frequency decomposition of the feedback signal generated by a single photodiode coupled to the optical bus waveguide downstream from the ring resonators to adjust the heater voltages.

8 Claims, 10 Drawing Sheets

(56) References Cited

U.S. PATENT DOCUMENTS

| | | | | |
|---|---|---|---|---|
| 2012/0051750 | A1* | 3/2012 | Yano | H04J 14/0221 |
| | | | | 398/91 |
| 2012/0070159 | A1* | 3/2012 | Ishihara | H04B 10/2513 |
| | | | | 398/202 |
| 2014/0003810 | A1 | 1/2014 | Dong et al. | |
| 2015/0132015 | A1* | 5/2015 | Hayakawa | G02F 1/0147 |
| | | | | 398/200 |
| 2015/0188659 | A1* | 7/2015 | Lipson | H04J 14/02 |
| | | | | 398/44 |
| 2015/0277053 | A1* | 10/2015 | Zheng | H04J 14/00 |
| | | | | 385/31 |
| 2015/0323818 | A1 | 11/2015 | Padmaraju et al. | |
| 2016/0336718 | A1* | 11/2016 | Takabayashi | H01S 5/1092 |
| 2017/0139236 | A1 | 5/2017 | Cao et al. | |
| 2017/0223437 | A1 | 8/2017 | Lee et al. | |
| 2017/0261692 | A1* | 9/2017 | Knights | G02F 1/025 |
| 2018/0159293 | A1* | 6/2018 | Bovington | G02F 1/0147 |

OTHER PUBLICATIONS

Zheng, Xuezhe, et al. "A high-speed, tunable silicon photonic ring modulator integrated with ultra-efficient active wavelength control." Optics express 22.10 (2014): 12628-12633.

Dong, Po, et al. "Reconfigurable 100 Gb/s silicon photonic network-on-chip." Journal of Optical Communications and Networking 7.1 (2015): A37-A43.

Shin, MyungJin, "Resolving the Thermal Challenges for Silicon Microring Resonator Devices," Lecture, High-Speed Circuits & Systems Lab., Dept. of Electrical and Electronic Engineering, Yonsei University, 2015, pp. 1-27.

Melikyan, A., et al. "Tapless locking of silicon ring modulators for WDM applications." Optical Fiber Communications Conference and Exhibition (OFC), 2017. IEEE, 2017.

Padmaraju, Kishore, et al. "Resolving the thermal challenges for silicon microring resonator devices." Nanophotonics 3.4-5 (2014): 269-281.

\* cited by examiner

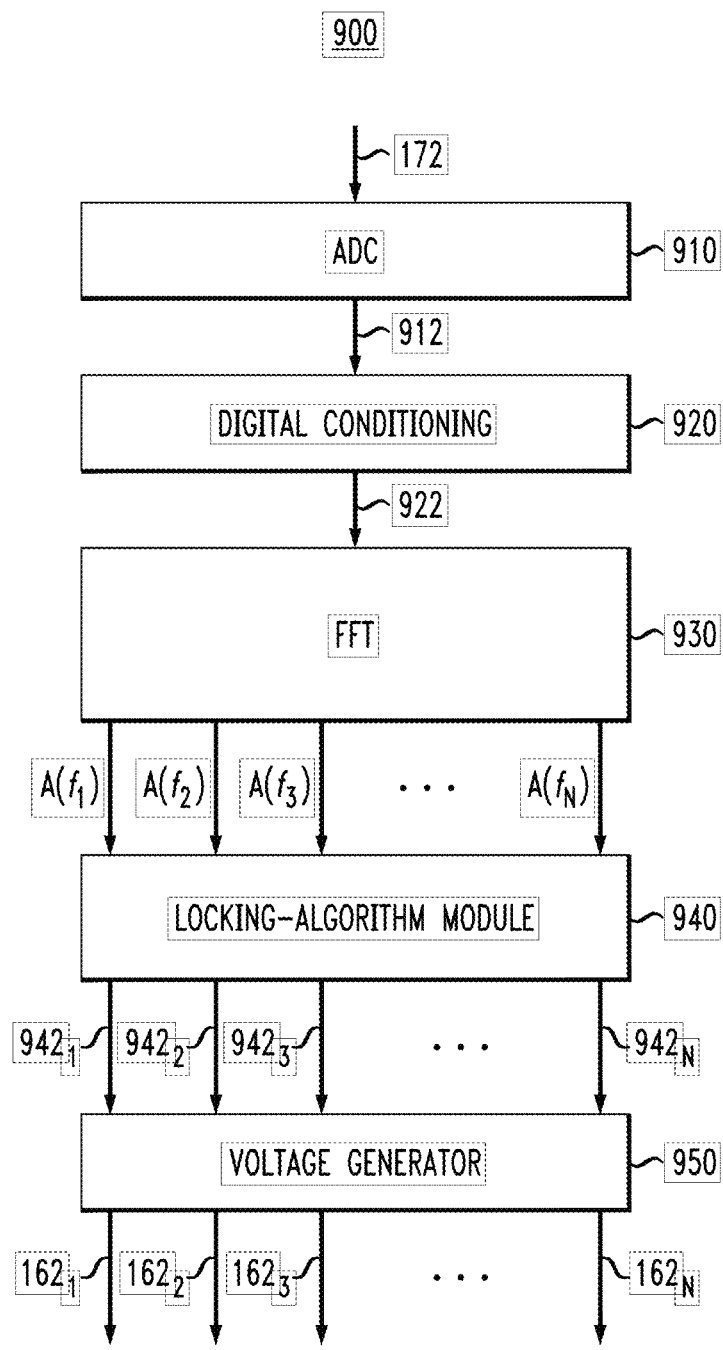

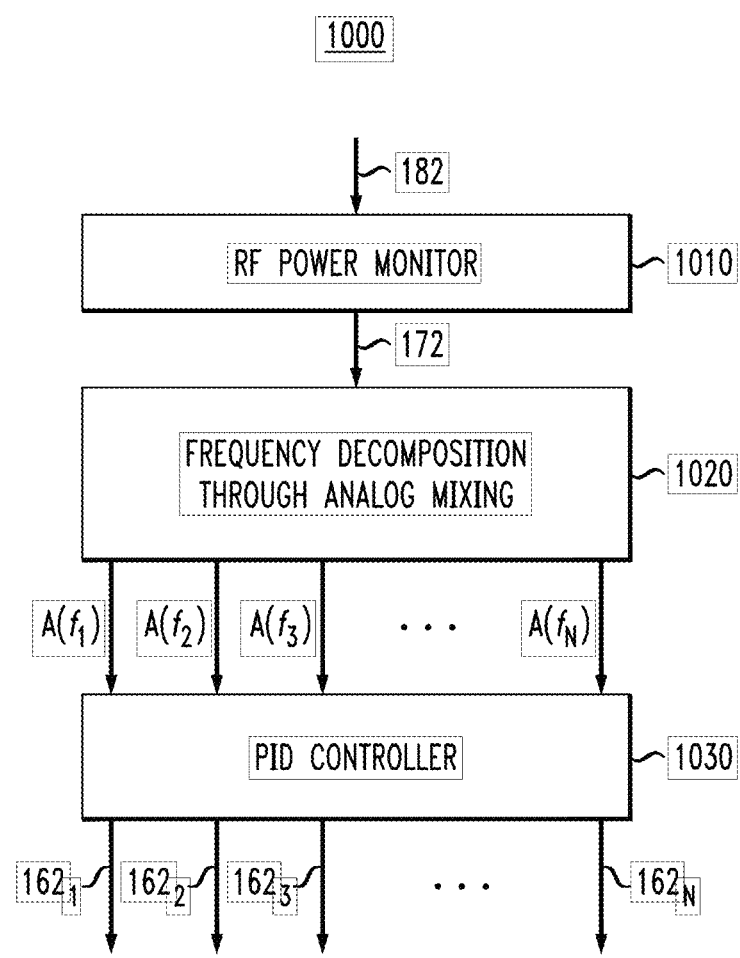

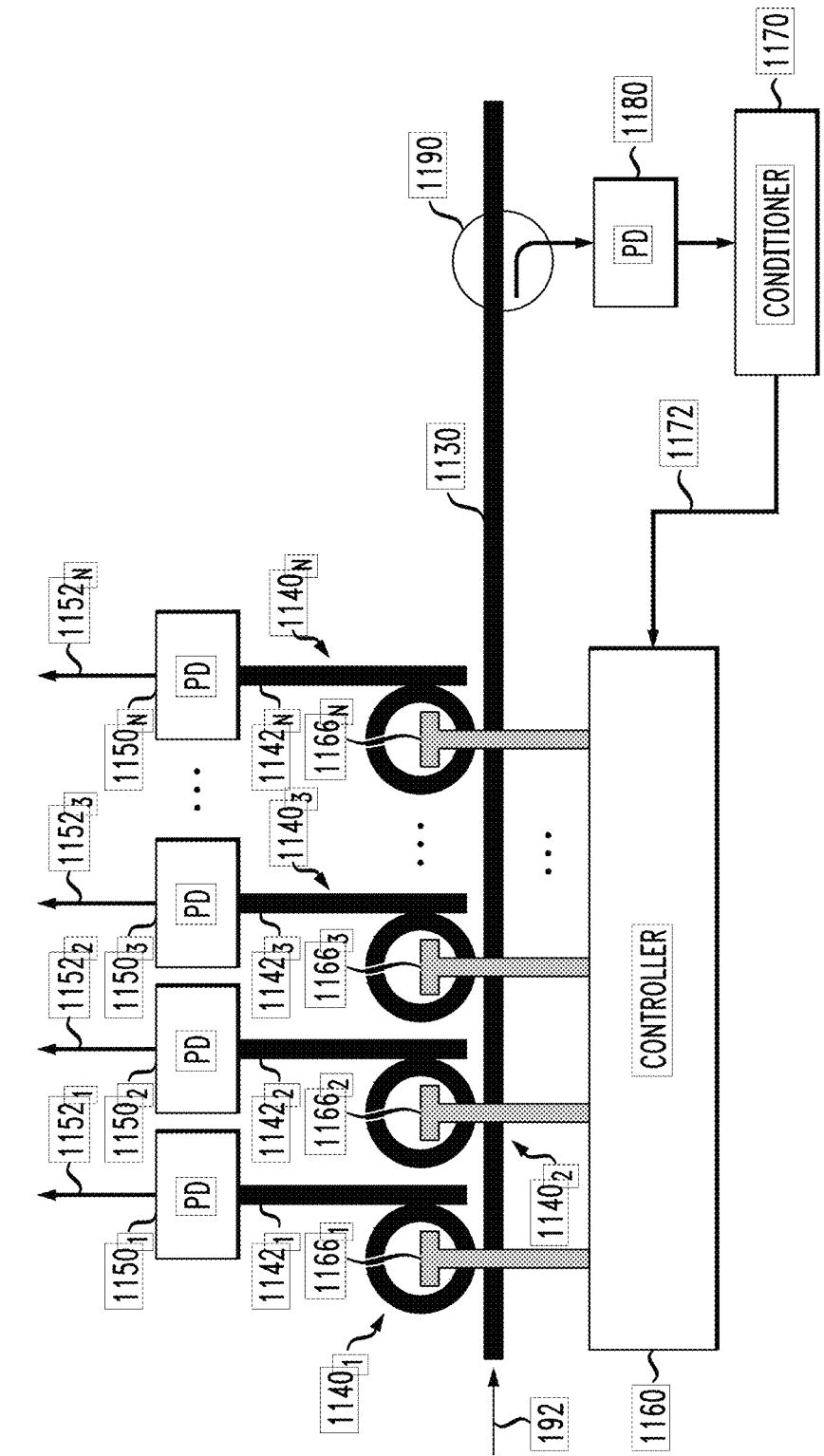

METHODS AND APPARATUS FOR TUNING OPTICAL MICRORING DEVICES

BACKGROUND

Field

Various example embodiments relate to optical communication equipment and, more specifically but not exclusively, to methods and apparatus for tuning optical microring devices.

Description of the Related Art

This section introduces aspects that may help facilitate a better understanding of the disclosure. Accordingly, the statements of this section are to be read in this light and are not to be understood as admissions about what is in the prior art or what is not in the prior art.

Microring devices can be used to implement a variety of photonic components (e.g., optical modulators, wavelength filters, optical switches, etc.) with desirable performance metrics, such as a small physical size, low power consumption, etc. Some microring-based silicon modulators can provide high modulation speeds (e.g., >10 Gbit/s) and are compatible with low-voltage (e.g., CMOS) driving circuits. These and other characteristics can make the microring devices very attractive, e.g., for use in massively parallel, high-speed optical networks.

SUMMARY OF SOME SPECIFIC EMBODIMENTS

Practical use of some microring devices may be hampered by their relatively high susceptibility to manufacturing imperfections and thermal fluctuations, e.g., due to the high thermo-optic coefficient of some constituent materials, such as silicon, and/or the resonant behavior of the microring. For example, to register and lock a microring with a corresponding laser wavelength, resonance adjustment may need to be performed to compensate the static resonant-frequency offset caused by the manufacturing-process variances and/or to track and cancel the dynamic resonant-frequency changes induced, e.g., by temperature fluctuations.

At least some embodiments disclosed herein address these and possibly other related problems in the state of the art by providing an optical system having a plurality of microring devices that can be tuned by regulating their local temperatures in a manner that enables (i) initial spectral alignment of the optical resonances with the desired carrier wavelengths of the WDM multiplex, (ii) fine-tuning of the microring devices to spectrally align a selected feature (e.g., an edge) of the optical resonances with the carrier wavelengths, and (iii) continuous tuning of the microring devices to counter any detuning thereof that might occur during operation. In an example embodiment, the initial spectral alignment can be performed using shallow intensity modulation or slight frequency modulation (chirp) of the different carrier wavelengths with different respective frequencies and subsequent detection of said frequencies in the photocurrents generated by the constituent semiconductor diodes of the individual microring devices under reverse-bias conditions. After the initial spectral alignment, the microring devices can be tuned by dithering the local temperatures and then using frequency decomposition of the feedback signal generated by a single photodiode coupled to the optical bus waveguide downstream from the microring devices to appropriately adjust the heater voltages.

Different embodiments can advantageously be used for tuning WDM transmitters and/or WDM receivers.

According to an example embodiment, provided is an apparatus comprising: a plurality of optical ring resonators optically coupled to an optical waveguide at respective locations along the optical waveguide; a plurality of heaters, each of the heaters being located at a respective one of the optical ring resonators; a photodetector optically coupled to the optical waveguide downstream from the respective locations; and an electronic controller being configured to: regulate the plurality of heaters in response to an electrical output signal generated by the photodetector while electrical drive signals of the heaters are being dithered in amplitude; and dither the electrical drive signals of different ones of the heaters with different respective frequencies.

According to another example embodiment, provided is an apparatus comprising: a light source configured to transmit a plurality of carrier wavelengths through an optical waveguide, each of the carrier wavelengths being modulated at a different respective frequency; a plurality of optical ring resonators optically coupled to the optical waveguide at respective locations along the optical waveguide to receive the plurality of carrier wavelengths, each of the optical ring resonators comprising a respective optical waveguide loop that includes at least a portion of a respective semiconductor diode capable of generating a respective photocurrent in response to light in said respective optical waveguide loop; a plurality of heaters, each of the heaters being located to heat a respective one of the optical ring resonators; and an electronic controller configured to regulate the plurality of heaters in response to detecting at least some of said respective frequencies in the respective photocurrents.

According to yet another example embodiment, provided is an apparatus comprising: a plurality of optical ring resonators optically coupled to an optical waveguide at respective locations along the optical waveguide; a plurality of phase shifters, each of the phase shifters being in a respective one of the optical ring resonators; a photodetector optically coupled to the optical waveguide downstream from the respective locations; and an electronic controller being configured to: regulate the plurality of phase shifters in response to an electrical output signal generated by the photodetector while electrical drive signals of the phase shifters are being dithered in amplitude; and dither the electrical drive signals of different ones of the phase shifters with different respective frequencies.

BRIEF DESCRIPTION OF THE DRAWINGS

Other aspects, features, and benefits of various disclosed embodiments will become more fully apparent, by way of example, from the following detailed description and the accompanying drawings, in which:

FIG. 9 shows a block diagram of an electrical circuit that can be used in the optical transmitter of FIG. 1 according to an embodiment;

FIG. 10 shows a block diagram of an electrical circuit that can be used in the optical transmitter of FIG. 1 according to another embodiment; and FIG. 11 shows a block diagram of an optical receiver according to an embodiment.

DETAILED DESCRIPTION

At least some embodiments may benefit from the use of some features disclosed in (i) U.S. Patent Application Publication No. 2014/0003810 and (ii) the article by Argishti Melikyan, Kwangwok Kim, Young-Kai Chen, and Po Dong, "Tapless locking of silicon ring modulators for WDM applications," published in the proceedings of 2017 Optical Fiber Communications Conference and Exhibition (OFC), both of which are incorporated herein by reference in their entirety.

Various embodiments can be used in optical transmitters and/or optical receivers, e.g., as described in more detail below.

Figure 1:
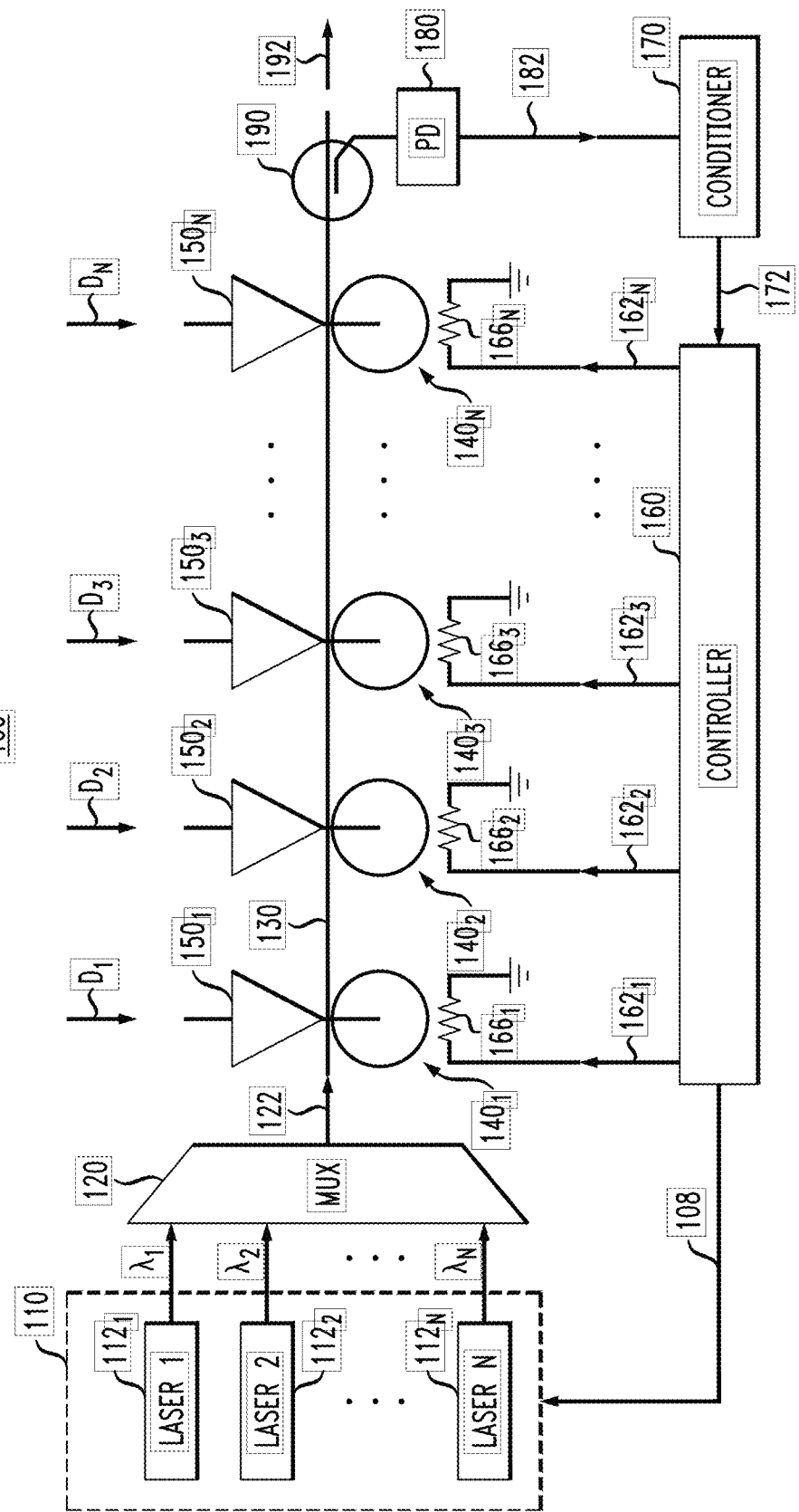
FIG. 1 shows a block diagram of an optical transmitter according to an embodiment.

FIG. 1 shows a block diagram of an optical transmitter 100 according to an embodiment. Transmitter 100 can be operated as a wavelength-division-multiplexing (WDM) transmitter. For example, an optical output signal 192 generated by transmitter 100 can have N wavelength components, each having a different one of carrier wavelengths $\lambda_1$, $\lambda_2$, ..., $\lambda_N$ and modulated with a different one of data streams $D_1$, $D_2$, ..., $D_N$, where N is a positive integer greater than one.

In an example embodiment, transmitter 100 comprises a light source 110 that includes lasers $112_1$-$112_N$, each configured to generate a respective one of the carrier wavelengths $\lambda_1$, $\lambda_2$, ..., $\lambda_N$. An optical multiplexer (MUX) 120 connected to the lasers $112_1$-$112_N$ as indicated in FIG. 1 operates to multiplex the carrier wavelengths and apply a resulting WDM signal 122 to an optical bus 130. In some embodiments, optical bus 130 can be implemented as an on-chip waveguide.

Transmitter 100 further comprises ring resonators $140_1$-$140_N$, each coupled to optical bus 130 using a suitable optical coupler. An example embodiment of ring resonator 140 is described in more detail below in reference to FIGS. 2A-2B. A person of ordinary skill in the art will understand that, in alternative embodiments, ring resonators 140 having other suitable physical structures may also be used.

In operation, each of ring resonators $140_1$-$140_N$ functions as an optical modulator configured to modulate a respective one of the carrier wavelengths $\lambda_1$, $\lambda_2$, ..., $\lambda_N$ in response to a respective one of data streams $D_1$, $D_2$, ..., $D_N$. More specifically, drive circuits $150_1$-$150_N$ use data streams $D_1$, $D_2$, ..., $D_N$, respectively, to appropriately drive ring resonators $140_1$-$140_N$. The modulated carrier wavelengths generated in this manner by ring resonators $140_1$-$140_N$ provide the WDM components for optical output signal 192. An example embodiment of drive circuit 150 is described in more detail below in reference to FIG. 3. A person of ordinary skill in the art will understand that, in alternative embodiments, other suitable drive circuits 150 may also be used.

Transmitter 100 further comprises: (i) a photodetector (e.g., a photodiode, PD) 180; (ii) an electrical-signal conditioner 170; and (iii) an electronic controller 160.

Photodetector 180 is optically coupled to optical bus 130 by way of an optical tap 190. As a result, photodetector 180 can receive a small portion (e.g., <10%) of the optical power of optical output signal 192 and convert the received light into a corresponding electrical output signal 182.

Electrical-signal conditioner (e.g., circuit or device) 170 includes electrical circuits that operate to appropriately process, condition, and/or transform electrical signal 182 into a form that is more suitable for the signal processing implemented in electronic controller 160. In some embodiments, circuit 170 may include some or all of the following: (i) a transimpedance amplifier; (ii) a frequency filter; (iii) a rectifier; (iv) a radio-frequency (RF) power meter or monitor; and (v) an analog-to-digital converter (ADC). The output signal generated by circuit 170 is an electrical signal 172 that is applied to electronic controller 160. Depending on the embodiment, electrical signal 172 can be an analog signal or a digital signal.

In some embodiments, circuit 170 can be omitted or integrated into electronic controller 160.

Electronic controller 160 operates to appropriately tune ring resonators $140_1$-$140_N$. In particular, controller 160 can be used to: (i) register each of ring resonators $140_1$-$140_N$ with an intended one of carrier wavelengths $\lambda_1$, $\lambda_2$, ..., $\lambda_N$; (ii) properly spectrally align the optical resonances of ring resonators $140_1$-$140_N$ with the respective carrier wavelengths to which the ring resonators are registered; and (iii) lock the spectral alignment to counter any possible detuning that might take place during operation of transmitter 100. These and other pertinent functions of controller 160 can be implemented, e.g., as described in more detail below, using: (i) the electrical inputs to the controller that may include, inter alia, electrical signal 172 (or 182) and a plurality of voltages $V_{pc,n}$ (not explicitly shown in FIG. 1; see FIG. 3) and (ii) the electrical outputs of the controller that may include, inter alia, a control signal 108 and a plurality of electrical signals $162_1$-$162_N$.

Control signal 108 is applied to light source 110 to imprint wavelength-identifier signals onto the carrier wavelengths $\lambda_1$, $\lambda_2$, ..., $\lambda_N$ generated by lasers $112_1$-$112_N$. In an example embodiment, a wavelength-identifier signal can be a relatively shallow (e.g., ~10% or less) amplitude modulation of the corresponding carrier wavelength. Different wavelength-identifier signals typically have different respective frequencies, e.g., in the kHz range of the RF spectrum, that enable unambiguous identification of the different carrier wavelengths by detecting those frequencies in the corresponding electrical or optical signals downstream from light source 110. An example of such detection is described in more detail below in reference to FIG. 3. The wavelength-identifier signals can be used, e.g., to register each of ring resonators $140_1$-$140_N$ with an intended one of carrier wavelengths $\lambda_1$, $\lambda_2$, ..., $\lambda_N$, e.g., as described in more detail below in reference to FIG. 5.

In one example embodiment, a wavelength-identifier signal can be imprinted onto a carrier wavelength by modulating, with the corresponding frequency, the injection current of the corresponding laser 112. In another example embodiment, a wavelength-identifier signal can be imprinted onto a carrier wavelength by using an optical modulator (not explicitly shown in FIG. 1), e.g., coupled between the corresponding laser 112 and MUX 120. A person of ordinary skill in the art will understand that other methods and apparatus for imprinting wavelength-identifier signals onto the carrier wavelengths $\lambda_1, \lambda_2, \ldots, \lambda_N$ can also be used.

In an alternative embodiment, a wavelength-identifier signal can be a relatively slight frequency modulation (e.g., chirp) of the corresponding carrier wavelength. Due to the resonant characteristics of ring resonators $140_1$-$140_N$, such chirp can modulate the electrical current flowing through the resonator structure and, as such, is detectable in a manner similar to that described below in reference to FIG. 3.

Figure 2A:
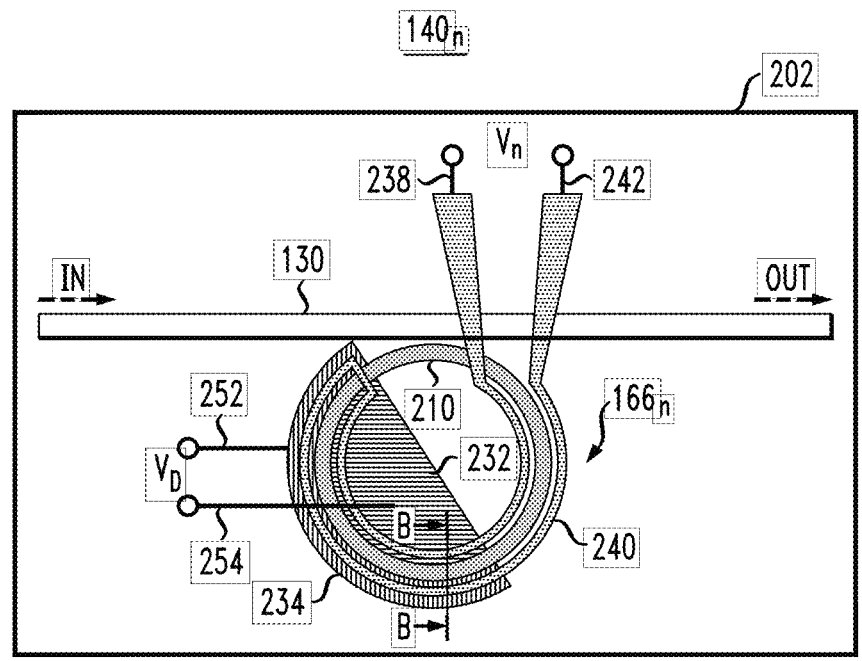
FIGS. 2A-2B show schematic diagrams of a ring resonator that can be used in the optical transmitter of FIG. 1 according to an embodiment.

Electrical signals $162_1$-$162_N$ are applied to heaters $166_1$-$166_N$, respectively. A heater $166_n$ may be a part of ring resonator $140_n$ and/or be located near the loop (e.g., circular) waveguide thereof, where n=1, 2, ..., N. In an example embodiment, heater $166_n$ can be positioned as indicated in FIG. 2A. In operation, electrical signal $162_n$ can be used to change the local temperature of ring resonator $140_n$, which can change the resonant frequency of the ring resonator through the thermo-optic effect.

In an example embodiment, controller 160 can be configured to generate electrical signal $162_n$ in accordance with Eq. (1):

$$V_n = V_{0,n} + V_{1,n} \sin(2\pi f_n t) \qquad (1)$$

where $V_n$ is the total voltage of electrical signal $162_n$; $V_{0,n}$ is the quasi-dc component of electrical signal $162_n$; $V_{1,n}$ is the amplitude of the ac component of electrical signal $162_n$; $f_n$ is the oscillation frequency of electrical signal $162_n$; and t is time. The oscillation frequencies $f_n$ are typically different for different n and can be, e.g., in the kHz range. The oscillation frequencies $f_n$ may also be different from the frequencies of the wavelength-identifier signals. The voltage $V_{0,n}$ can be slowly adjusted by controller 160, e.g., as described in more detail below in reference to FIGS. 6 and 8. As used herein, the term "slowly" means that the characteristic time with which the voltage $V_{0,n}$ is changed is significantly larger than the oscillation period corresponding to any of the oscillation frequencies $f_n$. The voltage $V_{1,n}$ is typically a constant that may or may not depend on n.

Figure 2B:
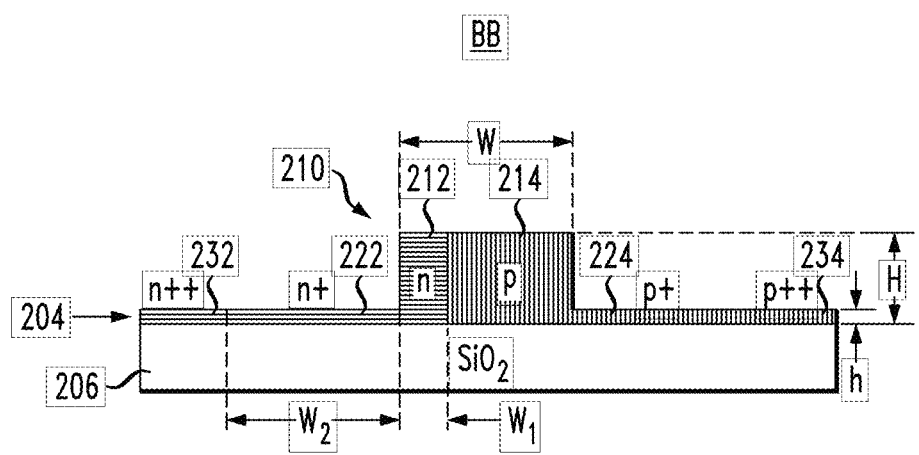

FIGS. 2A-2B show schematic diagrams of ring resonator $140_n$ according to an embodiment. More specifically, FIG. 2A shows a top view of ring resonator $140_n$. FIG. 2B shows a cross-sectional side view of ring resonator $140_n$ along the planar cross-section BB indicated in FIG. 2A.

The ring resonator $140_n$ shown in FIGS. 2A-2B can be implemented using CMOS-compatible processes and materials. For example, ring resonator $140_n$ of FIGS. 2A-2B can be fabricated using a silicon-on-insulator (SOI) substrate 202 and includes a circular waveguide (microring) 210 optically coupled to the optical bus waveguide 130 as indicated in FIG. 2A. Waveguides 210 and 130 can be formed, e.g., by properly etching down the top silicon layer supported on a silicon-oxide layer 206 of SOI substrate 202 (see FIG. 2B). A silicon-oxide cladding layer (not explicitly shown in FIG. 2B) can then be deposited over the structure shown in FIG. 2B to encapsulate the resulting ridge-waveguide core.

As shown, circular waveguide 210 is a ridge waveguide that has a portion 212 made of n-doped silicon and a portion 214 made of p-doped silicon, the two portions forming a PN junction 212/214 as indicated in FIG. 2B. The location of the PN junction 212/214 may be offset from the center of waveguide 210. In the shown embodiment, the PN junction 212/214 takes up approximately one-half of the microring circumference. In alternative embodiments, the corresponding PN junction may take up more or less than one-half of the microring circumference.

Ohmic contacts between the PN junction 212/214 and electrical terminals 252 and 254 are implemented by varying the dopant concentration within a silicon layer 204 that is adjacent to circular waveguide 210. More specifically, an n+-doped portion 222 and an n++-doped portion 232 of layer 204 are used to provide an ohmic contact between portion 212 of waveguide 210 and electrical terminal 254. A p+-doped portion 224 and a p++-doped portion 234 of layer 204 are similarly used to provide an ohmic contact between portion 214 of waveguide 210 and electrical terminal 252. Intermediately doped portions 222 and 224 are optional and may not be present in some embodiments.

In an example embodiment, a thin-film heater $166_n$ can be formed near circular waveguide 210, e.g., as indicated in FIG. 2A. For example, thin-film heater $166_n$ can be implemented using a titanium microstrip 240 that is vertically separated from circular waveguide 210 by a layer of silicon oxide (not explicitly shown in FIGS. 2A-2B). Electrical terminals 238 and 242 can then be used to apply electrical signal $162_n$ (e.g., $V_n$, Eq. (1)) to thin-film heater 240.

In operation, the PN junction 212/214 functions as a phase shifter. For example, when a reverse bias is applied to the PN junction 212/214, a depletion region forms within waveguide 210. During the positive swing of the drive voltage $V_D$ applied between electrical terminals 252 and 254, the size of this depletion region increases, thereby decreasing the effective refractive index of waveguide 210. During the negative swing of the drive voltage $V_D$, the size of this depletion region decreases, thereby increasing the effective refractive index of waveguide 210. This modulation of the effective refractive index modulates the resonant frequency of the microring accordingly, which changes the transmittance of the optical bus waveguide 130 at the corresponding carrier wavelength, thereby modulating the intensity thereof and generating the corresponding data-modulated component of optical WDM signal 192 (also see FIG. 1).

In some embodiments, circular waveguide 210 can be replaced by a suitable closed-loop waveguide that is not necessarily circular in shape. In different embodiments, such a loop waveguide can be selected from a rather broad range of suitable shapes. Such suitable loop shapes typically do not have sharp corners and/or other features that can cause relatively high optical losses.

As used herein, the term "ring resonator" should be construed to be inclusive of optical resonators having closed-loop waveguides of different suitable loop shapes. As such, the word "ring" should not be construed to unduly limit the covered embodiments to only those having circular waveguides therein.

In some embodiments, thin-film heater $166_n$ and/or the corresponding portion of circular waveguide 210 can be replaced by a phase shifter that can control a phase shift of the light traveling therethrough using a mechanism that is different from the thermo-optic effect. A variety of phase shifters that can be used for this purpose are known to those skilled in the pertinent art. In an example embodiment, such a phase shifter can be controlled using an electrical signal $162_n$ that can be described by Eq. (1), either quantitatively or approximately.

A person of ordinary skill in the art will understand that, together, thin-film heater $166_n$ and the corresponding portion of circular waveguide 210 form a phase shifter configured to operate based on the thermo-optic effect.

Figure 3:
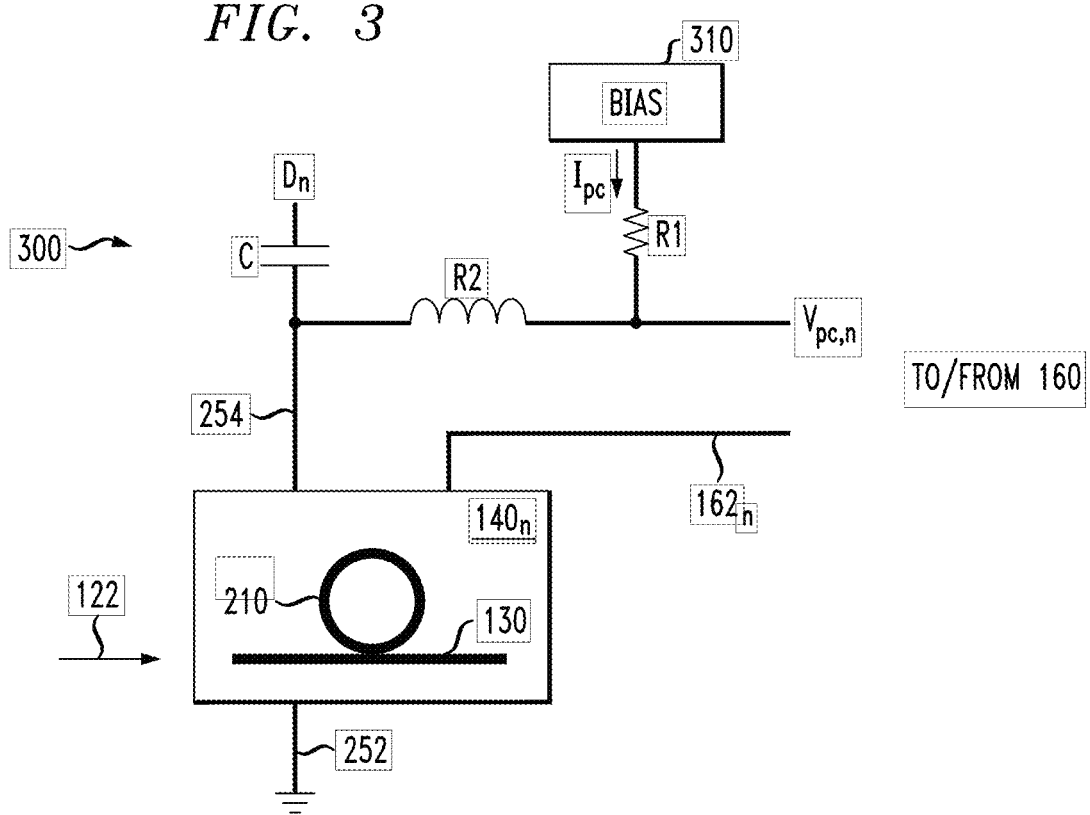
FIG. 3 shows a schematic diagram of an electrical circuit that can be used to operate the ring resonator shown in FIGS. 2A-2B according to an embodiment.

FIG. 3 shows a schematic diagram of an electrical circuit 300 that can be used to operate ring resonator $140_n$ according to an embodiment. Circuit 300 comprises a voltage generator 310 that is connected to electrical terminal 254 (also see FIG. 2A) of ring resonator $140_n$ through a bias-T formed by the capacitor C and resistors R1 and R2. In an example embodiment, voltage generator 310 operates to apply a reverse bias to the PN junction 212/214 of ring resonator $140_n$.

As used herein, the term "reverse bias" refers to an electrical configuration of a semiconductor-junction diode in which the N-type material is at a high electrical potential, and the P-type material is at a low electrical potential. The reverse bias typically causes the depletion layer to grow wider due to a lack of electrons and/or holes, which presents a high impedance path across the junction and substantially prevents a current flow therethrough. However, a very small reverse leakage current can still flow through the junction.

Similarly, the term "forward bias" refers to an electrical configuration of a semiconductor-junction diode in which the N-type material is at a low potential, and the P-type material is at a high potential. If the forward bias is greater than the intrinsic voltage drop across the corresponding PN or PIN junction, then the corresponding potential barrier can be overcome by the electrical carriers, and a relatively large forward current can flow through the junction.

The data stream $D_n$ (which can be carried, e.g., by a corresponding electrical NRZ signal) can be applied to the capacitor C as indicated in FIG. 3 (also see FIG. 1).

Under the reverse-bias conditions, the PN junction 212/214 is typically capable of generating a photocurrent in response to the light traveling through circular waveguide 210. In at least some embodiments, the PN junction 212/214 can generate such photocurrent, e.g., by way of two-photon absorption (TPA). At least a portion $I_{pc}$ of the generated photocurrent flows through the resistors R1 and R2, which can be converted into the corresponding voltage $V_{pc,n}$ as indicated in FIG. 3. The voltage $V_{pc,n}$ can be provided to electronic controller 160, where it can be used to determine the voltage $V_{0,n}$ for electrical signal $162_n$, e.g., as described below in reference to FIG. 5.

Figure 4:
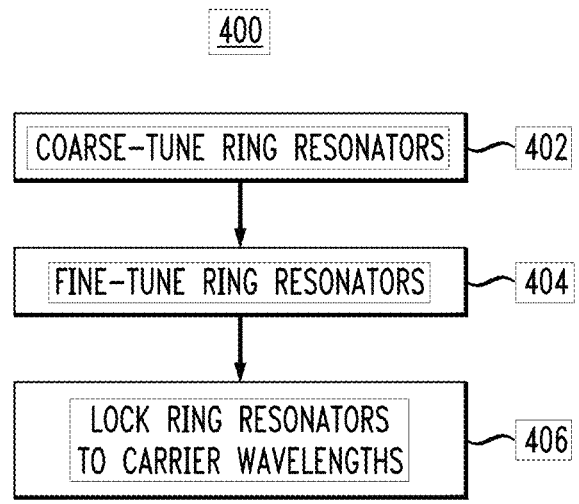
FIG. 4 shows a flowchart of a tuning method that can be used in the optical transmitter of FIG. 1 according to an embodiment.

FIG. 4 shows a flowchart of a tuning method 400 that can be used in optical transmitter 100 according to an embodiment.

At step 402 of method 400, each of ring resonators $140_1$-$140_N$ can be tuned to register the ring resonator with the intended one of carrier wavelengths $\lambda_1, \lambda_2, \ldots, \lambda_N$. Step 402 can be referred to as "coarse tuning," e.g., because, any ring resonator $140_n$ can initially be detuned from the intended carrier wavelength by a relatively large $\Delta\lambda$, e.g., such that the intended carrier wavelength is spectrally located outside of the resonator's frequency band (resonance; also see FIG. 7). The tuning performed at step 402 is therefore directed at tuning ring resonator $140_n$ such that the optical resonance thereof is spectrally moved closer to the intended carrier wavelength, e.g., in a manner that causes electrical signal 172 (see FIG. 1) to become sensitive to the spectral position of optical resonance relative to the intended carrier wavelength.

In an example embodiment, controller 160 can be configured to perform step 402 using control signal 108, voltages $V_{pc,n}$, and electrical signals $162_n$, e.g., as described in more detail below in reference to FIG. 5. Upon completion of step 402, ring resonators $140_1$-$140_N$ are typically tuned such that electrical signal 172 (FIG. 1) is sensitive to the relative spectral positions of the intended carrier wavelengths and the optical resonances of the corresponding ring resonators $140_n$.

At step 404, each of ring resonators $140_1$-$140_N$ is further tuned to spectrally align a selected feature of the optical resonances with the respective carrier wavelengths. In various embodiments, such a feature can be, e.g., the center frequency of the optical resonance, an edge of the optical resonance, etc.

In an example embodiment, controller 160 can be configured to perform step 404 using electrical signals 172 and $162_n$, e.g., as described in more detail below in reference to FIG. 6. Upon completion of step 404, ring resonators $140_1$-$140_N$ may be nearly optimally tuned for data transmission under the thermal profile existing across the ring resonators at that time.

At step 406, each of ring resonators $140_1$-$140_N$ may be continuously tuned to counter any detuning that might occur during operation. Such continuous tuning can be directed, e.g., at approximately maintaining the operating point(s) to which ring resonators $140_1$-$140_N$ were tuned upon the completion of step 404. In an example embodiment, controller 160 can be configured to perform step 406 using electrical signals 172 and $162_n$, e.g., as described in more detail below in reference to FIG. 8.

Figure 5:
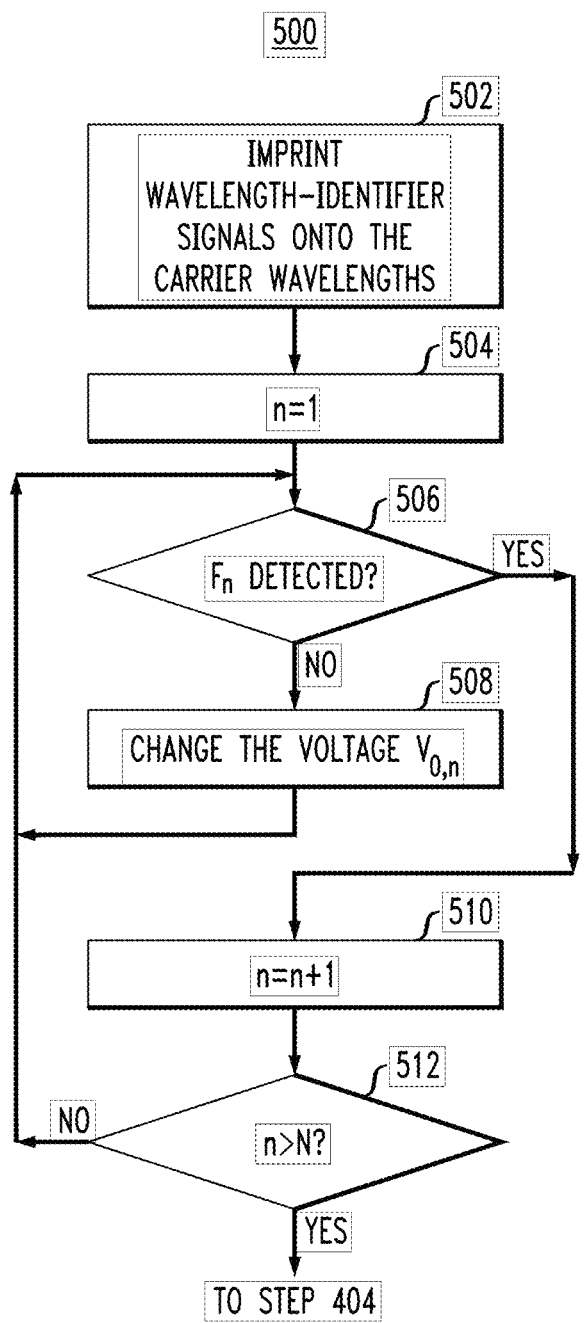
FIG. 5 shows a flowchart of a tuning method that can be used to implement a step of the tuning method of FIG. 4 according to an embodiment.

FIG. 5 shows a flowchart of an example tuning method 500 that can be used to implement step 402 of method 400 according to an embodiment.

At step 502 of method 500, controller 160 operates to generate control signal 108 (also see FIG. 1) in a manner that causes light source 110 to imprint different wavelength-identifier signals onto the carrier wavelengths $\lambda_1, \lambda_2, \ldots, \lambda_N$. For example, an n-th wavelength-identifier signal imprinted onto the carrier wavelengths $\lambda_n$ may have a respective modulation frequency $F_n$ that is different from the modulation frequency of any other wavelength-identifier signal. As indicated above, the modulation frequency $F_n$ can modulate the intensity the carrier wavelength $\lambda_n$ or impose a periodic chirp on the carrier wavelength $\lambda_n$.

Method 500 further includes a processing loop comprising steps 506-512 that can be repeated multiple times to tune different ones of ring resonators $140_1$-$140_N$. Although this processing loop is shown and described as being executed sequentially for different values of n, embodiments of method 500 are not so limited. A person of ordinary skill in the art will understand that controller 160 may alternatively be configured to execute several such processing loops in parallel, with different concurrently executed instances of the processing loop tuning different ones of ring resonators $140_1$-$140_N$.

Step 504 is the loop initialization step at which ring resonator $140_1$ is selected for tuning by setting the value of n to n=1. A person of ordinary skill in the art will understand that, in alternative embodiments, different ones of ring resonators $140_1$-$140_N$ may be selected for tuning in any suitable order and not necessarily one at a time.

At step 506, controller 160 processes the voltage $V_{pc,n}$ (see FIG. 3) to determine whether or not this voltage is modulated with the frequency $F_n$. Such processing may include subjecting the corresponding signal to frequency decomposition/analysis in a conventional manner, e.g., using a circuit comprising one or more of the following: a frequency filter, a frequency mixer, a spectrum analyzer, and a Fourier-transform circuit. If the frequency $F_n$ is not detected in the voltage $V_{pc,n}$, then the processing of method 500 is directed to step 508. Otherwise, the processing of method 500 is directed to step 510.

At step 508, controller 160 changes the voltage $V_{0,n}$ used in electrical signal $162_n$ (see Eq. (1)). The change causes the local temperature of ring resonator $140_n$ to change, which produces a corresponding spectral shift of the optical resonance of ring resonator $140_n$ due to the thermo-optic effect. The processing of method 500 is then directed back to step 506.

At step 510, a next ring resonator $140_n$ is selected for being tuned, by incrementing the value of n by one.

Step 512 serves to determine whether or not all of the ring resonators $140_1$-$140_N$ are registered with the corresponding carrier wavelengths. If yes, then method 500 is terminated, and the subsequent processing can typically be directed to step 404 of method 400 (FIG. 4). Otherwise, the processing of method 500 is directed back to step 506.

Figure 6:
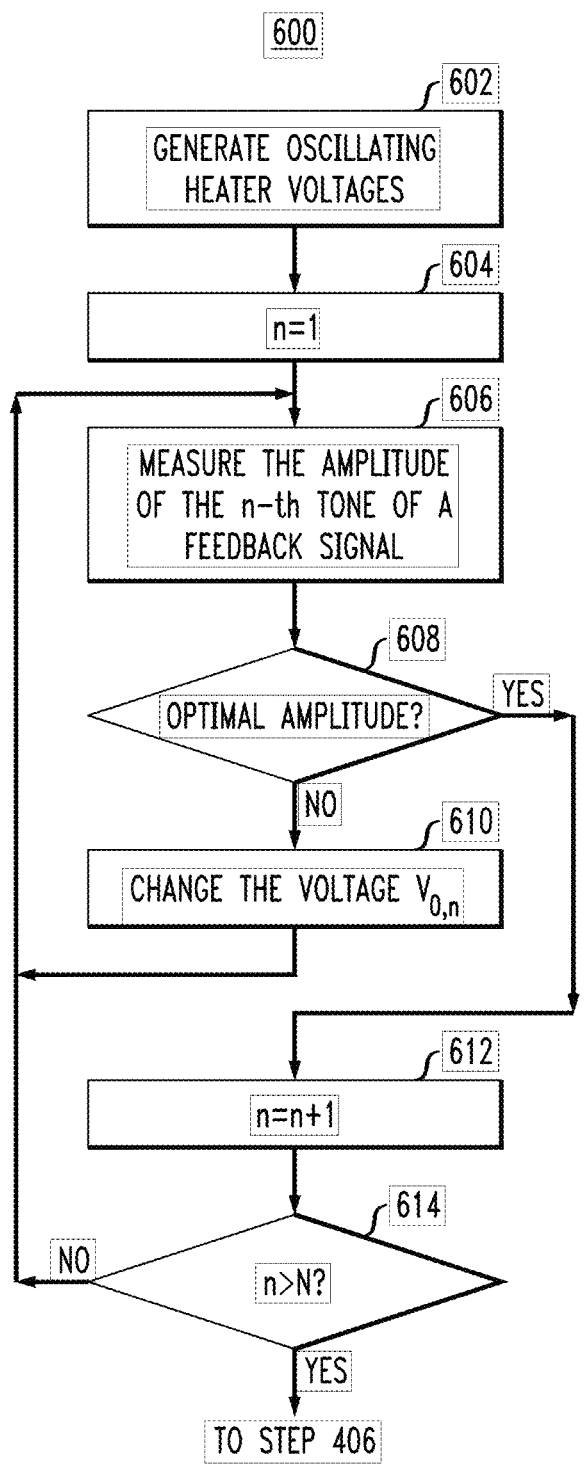
FIG. 6 shows a flowchart of a tuning method that can be used to implement another step of the tuning method of FIG. 4 according to an embodiment.

FIG. 6 shows a flowchart of an example tuning method 600 that can be used to implement step 404 of method 400 according to an embodiment. More specifically, method 600 is directed at tuning ring resonators $140_1$-$140_N$ such that each of carrier wavelengths $\lambda_1, \lambda_2, \ldots, \lambda_N$ becomes spectrally aligned with a selected edge of the optical resonance of the corresponding ring resonator, e.g., as graphically indicated in FIG. 7.

At step 602 of method 600, controller 160 operates to generate electrical signals $162_1$-$162_N$ in accordance with Eq. (1) using the voltages $V_{0,n}$ (n=1, 2, ..., N) determined at step 402 of method 400 (also see FIGS. 4-5).

Figure 7:
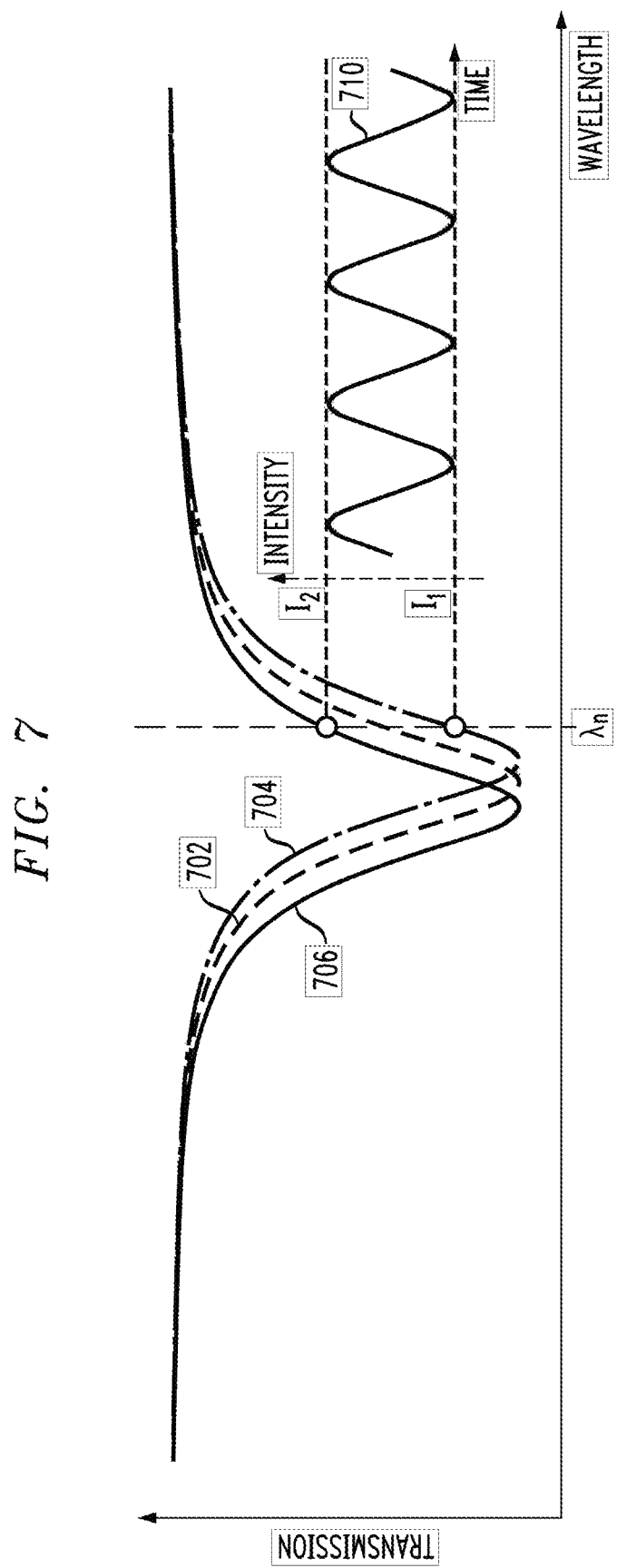
FIG. 7 graphically illustrates an example response of a ring resonator used in the optical transmitter of FIG. 1 according to an embodiment.

FIG. 7 graphically illustrates an example response of ring resonator $140_n$ to electrical signal $162_n$, e.g., generated at step 602 of method 600. Herein, the carrier wavelength $\lambda_n$ is located within the optical resonance of ring resonator $140_n$ represented by curves 702, 704, and 706. More specifically, the time dependence (dithering) of electrical signal $162_n$ (also see Eq. (1)) causes the optical resonance of ring resonator $140_n$ to oscillate between the spectral positions indicated by curves 704 and 706. Curve 702 indicates the spectral position of the optical resonance of ring resonator $140_n$ when the dithering is turned OFF (e.g., by setting the dither amplitude $V_{1,n}$ to zero; also see Eq. (1)).

Curve 710 shown in the inset of FIG. 7 illustrates the intensity modulation of the carrier wavelength $\lambda_n$ caused by the oscillation of the optical resonance of ring resonator $140_n$ between the spectral positions 704 and 706. For example, when the optical resonance is at position 704, the transmission of ring resonator $140_n$ at the carrier wavelength $\lambda_n$ is relatively low, which causes the corresponding WDM component of optical output signal 192 to have a relatively low intensity $I_1$. When the optical resonance is at position 706, the transmission of ring resonator $140_n$ at the carrier wavelength $\lambda_n$ is relatively high, which causes the corresponding WDM component of optical output signal 192 to have a relatively high intensity $I_2$. The oscillation of the optical resonance between positions 704 and 706 thus causes the intensity of the corresponding WDM component of optical output signal 192 to oscillate between the intensities $I_1$ and $I_2$ with the frequency $f_n$ as indicated by curve 710.

Due to the dither-induced intensity modulation of carrier wavelengths $\lambda_1, \lambda_2, \ldots, \lambda_N$ with frequencies $f_1, f_2, \ldots, f_N$, respectively, electrical signal 172 (see FIG. 1) typically contains multiple corresponding frequency tones. The amplitudes of these frequency tones can be measured, e.g., as known in the pertinent art, by subjecting electrical signal 172 to frequency decomposition/analysis. Example circuits that can be used in controller 160 for this purpose are described in more detail below in reference to FIGS. 9-10.

Referring back to FIG. 6, method 600 has a processing loop comprising steps 606-614 that can be run multiple times to tune different ones of ring resonators $140_1$-$140_N$. Although this processing loop is shown and described as being executed sequentially for different values of n, embodiments of method 600 are not so limited. A person of ordinary skill in the art will understand that controller 160 may alternatively be configured to execute several such processing loops in parallel, with different concurrently executed instances of the processing loop being configured to tune different ones of ring resonators $140_1$-$140_N$.

Step 604 is the loop initialization step at which ring resonator $140_1$ is selected for tuning by setting the loop-index value n to n=1. A person of ordinary skill in the art will understand that, in alternative embodiments, different ones of ring resonators $140_1$-$140_N$ may be selected for tuning in any suitable order and not necessarily one at a time.

At step 606, controller 160 processes electrical signal 172 to measure the amplitude of the n-th tone thereof (e.g., the tone having the frequency $f_n$). In different embodiments, step 606 can be performed in the analog domain or in the digital domain.

At step 608, controller 160 determines whether or not the amplitude measured at step 606 has an optimal value. If the measured amplitude does not have an optimal value, then the processing of method 600 is directed to step 610. Otherwise, the processing of method 600 is directed to step 612.

In an example embodiment, an optimal value of the amplitude may be close to the maximum possible amplitude of the n-th tone of electrical signal 172. Said maximum amplitude typically corresponds to the spectral alignment in which the steepest slope of curve 702 is at the carrier wavelength $\lambda_n$ (also see FIG. 7). This spectral alignment can be beneficial, e.g., because it facilitates the opening of the eye of optical signal 192 at the carrier wavelength $\lambda_n$.

Step 608 can therefore be implemented using conventional methods for finding an approximate maximum of a signal. For example, thresholding the changes of the tone's amplitude caused by the changes of electrical signal $162_n$ or estimating the derivative of the tone's amplitude with respect to the voltage $V_{0,n}$ (see Eq. (1)) can be used for this purpose. Other suitable methods can also be applied as known in the pertinent art.

At step 610, controller 160 changes the voltage $V_{0,n}$ used in electrical signal $162_n$ (see Eq. (1)). The change causes the local temperature of ring resonator $140_n$ to change, which produces a corresponding spectral shift of the curves 702-706 due to the thermo-optic effect. The processing of method 600 is then directed back to step 606.

At step 612, a next ring resonator $140_n$ is selected for tuning, by incrementing the value of n by one.

Step 614 serves to determine whether or not all of the ring resonators $140_1$-$140_N$ have been tuned to optimize the optical modulation amplitude. If yes, then method 600 is terminated, and the subsequent processing can typically be directed to step 406 of method 400 (FIG. 4). Otherwise, the processing of method 600 is directed back to step 606.

Figure 8:
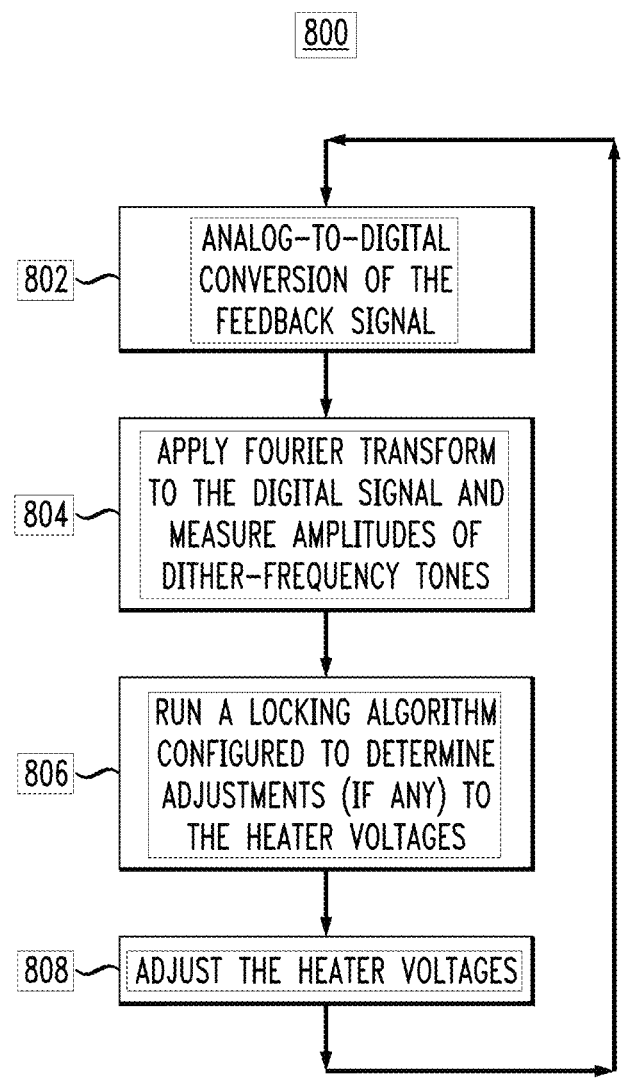
FIG. 8 shows a flowchart of a tuning method that can be used to implement yet another step of the tuning method of FIG. 4 according to an embodiment.

FIG. 8 shows a flowchart of an example tuning method 800 that can be used to implement step 406 of method 400 according to an embodiment. More specifically, method 800 is directed at continuously adjusting the quasi-dc heater voltages $V_{0,n}$ of signals $162_1$-$162_N$ to maintain the spectral alignments obtained at step 404 of method 400.

At step 802 of method 800, controller 160 operates to convert electrical signal 172 into digital form. Step 802 may also include some signal conditioning, performed either before or after the conversion, or both.

At step 804, controller 160 operates to apply a Fourier transform to the signal generated at step 802. The resulting digital spectrum typically contains pronounced spectral components at frequencies $f_1, f_2, \ldots, f_N$ due to the presence of the above-described frequency tones in electrical signal 172. The amplitudes of these spectral components can be measured and stored in the memory for further use, e.g., at step 806.

At step 806, controller 160 uses the amplitudes of the spectral components measured at step 804 as inputs to a locking algorithm configured to determine adjustments (if any are needed) to the voltages $V_{0,n}$, with the adjustments being such that the spectral alignments achieved at step 404 of method 400 can be maintained. As already indicated above, some or all of the voltages $V_{0,n}$ may need to be adjusted, from time to time, to counter possible detuning of ring resonators $140_1$-$140_N$ caused, e.g., by local temperature fluctuations.

In an example embodiment, the locking algorithm used at step 806 may be configured to keep the amplitudes of the spectral components located at frequencies $f_1, f_2, \ldots, f_N$ near their respective maximum values. Many signal-processing algorithms suitable for this purpose are known to persons skilled in the pertinent art. One example of such an algorithm is a least mean squares (LMS) algorithm.

At step 808, controller 160 operates to change some or all of heater signals $162_1$-$162_N$ using the adjustments determined at step 806. The processing of method 800 is then directed back to step 802.

FIG. 9 shows a block diagram of an electrical circuit 900 that can be used in controller 160 (FIG. 1) according to an embodiment. Circuit 900 can be used, e.g., to generate heater signals $162_1$-$162_N$ in response to feedback signal 172. Circuit 900 can also be used to implement method 800, e.g., as described below.

Circuits 910 and 920 of circuit 900 can be used to implement step 802 of method 800. More specifically, circuit 910 comprises an analog-to-digital converter (ADC) that operates in a conventional manner to convert feedback signal 172 into a corresponding stream 912 of digital samples. Circuit 920 may then be used to apply some digital processing to digital stream 912, thereby converting it to a digital stream 922 that may be better suited for the signal processing implemented in the downstream circuits. In some embodiments, circuit 920 may be absent.

A fast-Fourier-transform (FFT) module 930 can be used to implement step 804 of method 800. In operation, FFT module 930 applies Fourier transformation to digital stream 922, thereby converting it into a corresponding set of spectral samples. FFT module 930 may then filter and/or post-process the generated spectral samples to determine or estimate the amplitudes $A(f_1), A(f_2), \ldots, A(f_N)$ of the frequency tones located at frequencies $f_1, f_2, \ldots, f_N$. The amplitudes $A(f_1), A(f_2), \ldots, A(f_N)$ are then outputted for further use in the downstream circuits.

A locking-algorithm module 930 can be used to implement step 806 of method 800. In operation, module 930 runs, for example, an LMS algorithm to generate control signals $942_1$-$942_N$ in response to the amplitudes $A(f_1), A(f_2), \ldots, A(f_N)$ received from FFT module 930. Module 930 then applies control signals $942_1$-$942_N$ to a voltage generator 950.

Voltage generator 950 can be used to implement step 808 of method 800. In response to control signals $942_1$-$942_N$ received from module 930, voltage generator 950 generates heater signals $162_1$-$162_N$, wherein some of the voltages $V_{0,n}$ may have been adjusted to counteract the detuning of the corresponding ones of ring resonators $140_1$-$140_N$.

FIG. 10 shows a block diagram of an electrical circuit 1000 that can be used in controller 160 (FIG. 1) according to another embodiment. Circuit 1000 can be used, e.g., to generate heater signals $162_1$-$162_N$ in response to the PD output signal 182. Circuit 1000 can also be used to implement step 406 of method 400.

Circuit 1000 comprises an RF power monitor 1010 capable of monitoring the power of PD output signal 182 within the appropriate bandwidth greater than any of the frequencies $f_1, f_2, \ldots, f_N$. In this embodiment, the electrical output signal 172 generated by power monitor 1010 can be a superposition of RF components at frequencies $f_1, f_2, \ldots, f_N$, each proportional to the optical-modulation amplitude at that frequency.

Circuit 1000 further comprises an analog frequency analyzer 1020 configured to determine or estimate the amplitudes $A(f_1), A(f_2), \ldots, A(f_N)$ of the RF components of signal 172 located at frequencies $f_1, f_2, \ldots, f_N$. In an example embodiment, frequency analyzer 1020 may include a tunable RF source operating as a local oscillator, an RF signal mixer, and one or more frequency filters connected in a conventional manner. A sweep of the tunable RF source through the appropriate frequency range enables selection of the different RF components of signal 172 for amplitude measurements. The amplitudes $A(f_1), A(f_2), \ldots, A(f_N)$ measured in this manner are then applied to a proportional-integral-differential (PID) controller 1030.

In response to the amplitudes $A(f_1), A(f_2), \ldots, A(f_N)$ received from analog frequency analyzer 1020, PID controller 1030 generates heater signals $162_1$-$162_N$ such that each of said amplitudes is driven toward or kept near the maximum possible value thereof. The latter can be achieved, e.g., by appropriately adjusting the voltages $V_{0,n}$ to counteract the detuning of the ring resonators $140_1$-$140_N$.

FIG. 11 shows a block diagram of an optical receiver 1100 according to an embodiment. Receiver 1100 can be operated as a WDM receiver capable of properly detecting optical output signal 192 generated by WDM transmitter 100 (FIG. 1). As already indicated above, optical signal 192 may have N wavelength components, each having a different one of carrier wavelengths $\lambda_1, \lambda_2, \ldots, \lambda_N$.

Receiver 1100 comprises ring resonators $1140_1$-$1140_N$, each coupled to an optical bus 1130 using a suitable optical coupler. Ring resonator $1140_n$ differs from ring resonator $140_n$ (FIG. 1) in that ring resonator $1140_n$ additionally includes a drop waveguide $1142_n$ coupled to circular waveguide 210 (see FIG. 2). Each of drop waveguides $1142_1$-$1142_N$ is configured to feed light into a respective one of photodetectors $1150_1$-$1150_N$. In operation, ring resonators $1140_1$-$1140_N$ work as demultiplexing filters that distribute different modulated carrier wavelengths to different ones of photodetectors $1150_1$-$1150_N$.

Receiver 1100 further comprises an electronic controller 1160 that can tune ring resonators $1140_1$-$1140_N$ using heaters $1166_1$-$1166_N$, respectively. Said tuning can be performed using: (i) a feedback signal 1172 generated using an optical tap 1190, a photodetector 1180, and an optional electrical-signal conditioner (e.g., circuit or device) 1170 and/or (ii) electrical signals $1152_1$-$1152_N$ generated by photodetectors $1150_1$-$1150_N$. In particular, controller 1160 can be used to: (i) register each of ring resonators $1140_1$-$1140_N$ with an intended one of carrier wavelengths $\lambda_1, \lambda_2, \ldots, \lambda_N$; (ii) properly spectrally align the optical resonances of ring resonators $1140_1$-$1140_N$ with the respective carrier wavelengths to which the ring resonators are registered; and (iii) maintain the spectral alignment to counter any possible detuning of ring resonators $1140_1$-$1140_N$ that might take place during operation of receiver 1100.

A person of ordinary skill in the art will understand, without any undue experimentation, how to adapt at least some of the above-described methods 400, 500, 600, and 800 for use in receiver 1100.

According to an example embodiment disclosed above, e.g., in the summary section and/or in reference to any one or any combination of some or all of FIGS. 1-11, provided is an apparatus comprising: a plurality of optical ring resonators (e.g., 140$_1$-140$_N$, FIG. 1) optically coupled to an optical waveguide (e.g., 130, FIG. 1) at respective locations along the optical waveguide; a plurality of heaters (e.g., 166$_1$-166$_N$, FIG. 1), each of the heaters being located at a respective one of the optical ring resonators; a photodetector (e.g., 180, FIG. 1) optically coupled to the optical waveguide downstream from the respective locations; and an electronic controller (e.g., 160, FIG. 1) being configured to: regulate (e.g., at 404, 406, FIG. 4) the plurality of heaters in response to an electrical output signal generated by the photodetector while electrical drive signals of the heaters are being dithered in amplitude (e.g., in accordance with Eq. (1)); and dither the electrical drive signals of different ones of the heaters with different respective frequencies.

In some embodiments of the above apparatus, the electronic controller is further configured to: measure (e.g., at 606, FIG. 6; 804, FIG. 8) amplitudes of frequency tones of the electrical output signal at the different respective frequencies; and regulate (e.g., at 610, FIG. 6; 808, FIG. 8) each of the heaters using measured values of a respective one of said amplitudes.

In some embodiments of any of the above apparatus, the electronic controller comprises a Fourier-transform circuit (e.g., 930, FIG. 9) configured to measure amplitudes of frequency tones of the electrical output signal by applying a Fourier transform to digital samples corresponding to the electrical output signal.

In some embodiments of any of the above apparatus, the electronic controller comprises a frequency analyzer (e.g., 1020, FIG. 10) configured to measure amplitudes of frequency tones of the electrical output signal using analog frequency decomposition.

In some embodiments of any of the above apparatus, the electronic controller comprises a radio-frequency power monitor (e.g., 1010, FIG. 10) connected to provide an electrical input to the frequency analyzer in response to the electrical output signal.

In some embodiments of any of the above apparatus, the electronic controller is configured to regulate a particular one of the heaters based on a measurement of a frequency component of the electrical output signal, the frequency component being of the respective frequency used to dither the electrical drive signal of the particular one of the heaters.

In some embodiments of any of the above apparatus, the electronic controller is configured to regulate the particular one of the heaters such that the amplitude of the frequency component of the respective frequency remains near a maximum thereof.

In some embodiments of any of the above apparatus, the apparatus further comprises an optical WDM transmitter (e.g., 100, FIG. 1) that includes the plurality of optical ring resonators.

In some embodiments of any of the above apparatus, the apparatus further comprises an optical WDM receiver (e.g., 1100, FIG. 11) that includes the plurality of optical ring resonators.

In some embodiments of any of the above apparatus, the apparatus further comprises a light source (e.g., 110, FIG. 1) configured to transmit a plurality of carrier wavelengths through the optical waveguide.

In some embodiments of any of the above apparatus, the electronic controller is configured to regulate each of the heaters to spectrally align (e.g., at 402, 404, FIG. 4) a resonance (e.g., 702, FIG. 7) of a respective one of the optical ring resonators with a respective carrier wavelength (e.g., $\lambda_n$, FIG. 7) of the plurality of carrier wavelengths.

In some embodiments of any of the above apparatus, each of the optical ring resonators comprises a respective optical waveguide loop (e.g., 210, FIG. 2A) that includes at least a portion of a respective semiconductor diode (e.g., 212/214, FIG. 2B) configured to generate a respective photocurrent (e.g., $I_{pc}$, FIG. 3) in response to light in said respective optical waveguide loop; and wherein the electronic controller is further configured to regulate (e.g., at 402, FIG. 4) each of the heaters in response to the respective photocurrent.

According to another example embodiment disclosed above, e.g., in the summary section and/or in reference to any one or any combination of some or all of FIGS. 1-11, provided is an apparatus comprising: a light source (e.g., 110, FIG. 1) configured to transmit a plurality of carrier wavelengths through an optical waveguide, each of the carrier wavelengths being modulated at a different respective frequency (e.g., $F_n$, FIG. 5); a plurality of optical ring resonators (e.g., 140$_1$-140$_N$, FIG. 1) optically coupled to the optical waveguide (e.g., 130, FIG. 1) at respective locations along the optical waveguide to receive the plurality of carrier wavelengths, each of the optical ring resonators comprising a respective optical waveguide loop (e.g., 210, FIG. 2A) that includes at least a portion of a respective semiconductor diode (e.g., 212/214, FIG. 2B) capable of generating a respective photocurrent (e.g., $I_{pc}$, FIG. 3) in response to light in said respective optical waveguide loop; a plurality of heaters (e.g., 166$_1$-166$_N$, FIG. 1), each of the heaters being located to heat a respective one of the optical ring resonators; and an electronic controller (e.g., 160, FIG. 1) configured to regulate (e.g., at 402, FIG. 4; 508, FIG. 5) the plurality of heaters in response to detecting at least some of said respective frequencies in the respective photocurrents.

In some embodiments of the above apparatus, the electronic controller is further configured to regulate each one of the heaters to about spectrally align (e.g., at 402, FIG. 4) a resonance (e.g., 702, FIG. 7) of the respective one of the optical ring resonators with a respective one of the carrier wavelengths (e.g., $\lambda_n$, FIG. 7) based on detecting the respective frequency in the respective photocurrent.

In some embodiments of any of the above apparatus, the apparatus further comprises an optical WDM transmitter (e.g., 100, FIG. 1) that includes the plurality of optical ring resonators.

In some embodiments of any of the above apparatus, the apparatus further comprises an optical WDM receiver (e.g., 1100, FIG. 11) that includes the plurality of optical ring resonators.

In some embodiments of any of the above apparatus, at least some of the respective photocurrents are generated by way of two-photon absorption in the respective optical waveguide loops.

In some embodiments of any of the above apparatus, the light source is configured to intensity-modulate the carrier wavelengths with the different respective frequencies using a modulation depth of less than about 10%.

In some embodiments of any of the above apparatus, the light source is configured to chirp the carrier wavelengths with the different respective frequencies.

According to yet another example embodiment disclosed above, e.g., in the summary section and/or in reference to any one or any combination of some or all of FIGS. 1-11, provided is an apparatus comprising: a plurality of optical ring resonators (e.g., $140_1$-$140_N$, FIG. 1) optically coupled to an optical waveguide (e.g., 130, FIG. 1) at respective locations along the optical waveguide; a plurality of phase shifters (e.g., 210/$166_n$, FIG. 2), each of the phase shifters being in a respective one of the optical ring resonators; a photodetector (e.g., 180, FIG. 1) optically coupled to the optical waveguide downstream from the respective locations; and an electronic controller (e.g., 160, FIG. 1) being configured to: regulate (e.g., at 404, 406, FIG. 4) the plurality of phase shifters in response to an electrical output signal generated by the photodetector while electrical drive signals of the phase shifters are being dithered in amplitude (e.g., in accordance with Eq. (1)); and dither the electrical drive signals of different ones of the phase shifters with different respective frequencies.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As used herein and in the claims, the term "provide" with respect to a system, device, or component encompasses designing or fabricating the system, device, or component; causing the system, device, or component to be designed or fabricated; and/or obtaining the system, device, or component by purchase, lease, rental, or other contractual arrangement.

What is claimed is:

1. An apparatus comprising:
    a light source configured to transmit a plurality of carrier wavelengths through an optical waveguide, each of the carrier wavelengths being modulated at a different respective frequency;
    a plurality of optical ring resonators optically coupled to the optical waveguide at respective locations along the optical waveguide to receive the plurality of carrier wavelengths, each of the optical ring resonators comprising a respective optical waveguide loop that includes at least a portion of a respective semiconductor diode capable of generating a respective photocurrent in response to light in said respective optical waveguide loop;
    a plurality of heaters, each of the heaters being located to heat a respective one of the optical ring resonators; and
    an electronic controller configured to regulate the plurality of heaters in response to detecting at least some of said respective frequencies in the respective photocurrents.

2. The apparatus of claim 1, wherein the electronic controller is further configured to regulate each one of the heaters to about spectrally align a resonance of the respective one of the optical ring resonators with a respective one of the carrier wavelengths based on detecting the respective frequency in the respective photocurrent.

3. The apparatus of claim 1, further comprising an optical WDM transmitter that includes the plurality of optical ring resonators.

4. The apparatus of claim 1, further comprising an optical WDM receiver that includes the plurality of optical ring resonators.

5. The apparatus of claim 1, wherein at least some of the respective photocurrents are generated by way of two-photon absorption in the respective optical waveguide loops.

6. The apparatus of claim 1, wherein the light source is configured to intensity-modulate the carrier wavelengths with the different respective frequencies using a modulation depth of less than about 10%.

7. The apparatus of claim 1, wherein the light source is configured to chirp the carrier wavelengths with the different respective frequencies.

8. The apparatus of claim 1, wherein the respective semiconductor diode comprises an n-semiconductor portion of an optical core of the respective optical waveguide loop and a p-semiconductor portion of said optical core.

* * * * *